(12) United States Patent
Tado

(10) Patent No.: US 8,959,978 B2
(45) Date of Patent: Feb. 24, 2015

(54) FORGING PRESS AND METHOD OF CONTROLLING SAME

(71) Applicant: Sumitomo Heavy Industries, Ltd., Tokyo (JP)

(72) Inventor: Masashi Tado, Ehime (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 104 days.

(21) Appl. No.: 13/623,341

(22) Filed: Sep. 20, 2012

(65) Prior Publication Data

US 2013/0074571 A1   Mar. 28, 2013

(30) Foreign Application Priority Data

Sep. 27, 2011   (JP) .................. 2011-210271

(51) Int. Cl.
*B21J 7/46*   (2006.01)
*B21J 9/18*   (2006.01)
*B21J 9/20*   (2006.01)

(52) U.S. Cl.
CPC ...... *B21J 9/20* (2013.01); *B21J 9/18* (2013.01)
USPC ............... 72/452.5; 72/20.2; 72/443; 100/48; 100/52

(58) Field of Classification Search
CPC ...... B30B 9/3007; B30B 9/3057; B30B 1/26; B30B 1/266; B21J 9/18
USPC ............ 72/452.5, 441, 443, 28.1, 29.2, 20.2, 72/21.2; 100/48, 52
See application file for complete search history.

(56) References Cited

U.S. PATENT DOCUMENTS

| | | | |
|---|---|---|---|
| 7,357,073 B2 * | 4/2008 | Aoshima | 72/443 |
| 7,805,973 B2 | 10/2010 | Bosga et al. | |
| 8,302,452 B2 * | 11/2012 | Golorans et al. | 72/443 |
| 2011/0232513 A1 * | 9/2011 | Bosga | 72/429 |

FOREIGN PATENT DOCUMENTS

| | | |
|---|---|---|
| JP | 2004-114119 | 4/2004 |
| JP | 2009-525879 | 7/2009 |

* cited by examiner

*Primary Examiner* — David B Jones
(74) *Attorney, Agent, or Firm* — IPUSA, PLLC

(57) ABSTRACT

A forging press includes a slide configured to have a die attached thereto; a drive shaft configured to cause the slide to rise and lower by rotating; a flywheel connected to the drive shaft via a clutch; a servomotor connected to the drive shaft; and a control part configured to control respective operations of the clutch and the servomotor, wherein the control part is configured to perform such control as to cause the drive shaft to rotate with the driving of the flywheel in at least one of a rising process, in which the slide is caused to rise, to cause the slide to rise and a lowering process, in which the slide is caused to lower, to cause the slide to lower.

8 Claims, 4 Drawing Sheets

FORGING PRESS AND METHOD OF CONTROLLING SAME

CROSS-REFERENCE TO RELATED APPLICATION

This application is based upon and claims the benefit of priority of the prior Japanese Patent Application No. 2011-210271, filed on Sep. 27, 2011, the entire contents of which are incorporated herein by reference.

BACKGROUND OF THE INVENTION

1. Field of the Invention

The present invention relates generally to forging presses and methods of controlling the same, and more particularly to a forging press that includes both a flywheel and a servomotor as a drive source to cause an eccentric shaft to rotate and to a method of controlling the same.

2. Description of the Related Art

As a machine press that causes a slide to be moved upward and downward by the rotation of an eccentric shaft, a hybrid press has been proposed that includes both a flywheel and a servomotor as a drive source to cause the eccentric shaft to rotate.

The hybrid press described above includes a flywheel connected to an eccentric shaft via a clutch and a servomotor connected to the eccentric shaft via a clutch and brake unit. The hybrid press is described as being capable of increasing productivity by increasing the lowering speed and the rising speed of a slide by performing pressure forming with the rotational energy of the flywheel and causing the slide to move upward and downward before and after pressure forming with the servomotor.

However, because of the limited capacity of the servomotor, such a hybrid press has been developed only as a small-size hybrid press whose driven system such as a slide is limited in inertial mass, and has not been developed as a large-size hybrid press whose driven system has large inertial mass. Therefore, the conventional hybrid presses are small in size, and there have been no large-size hybrid presses.

SUMMARY OF THE INVENTION

According to an aspect of the present invention, a forging press includes a slide configured to have a die attached thereto; a drive shaft configured to cause the slide to rise and lower by rotating; a flywheel connected to the drive shaft via a clutch; a servomotor connected to the drive shaft; and a control part configured to control respective operations of the clutch and the servomotor, wherein the control part is configured to perform such control as to cause the drive shaft to rotate with driving of the flywheel in at least one of a rising process, in which the slide is caused to rise, to cause the slide to rise and a lowering process, in which the slide is caused to lower, to cause the slide to lower.

According to an aspect of the present invention, a method of controlling a forging press including a slide configured to have a die attached thereto, a drive shaft configured to cause the slide to rise and lower by rotating, a flywheel connected to the drive shaft via a clutch, and a servomotor connected to the drive shaft includes causing the drive shaft to rotate with driving of the flywheel in at least one of a rising process, in which the slide is caused to rise, to cause the slide to rise and a lowering process, in which the slide is caused to lower, to cause the slide to lower.

The object and advantages of the embodiments will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

As described above, the conventional hybrid presses are small in size, and there have been no large-size hybrid presses. Therefore, the inventor of the present invention has made a study of a large-size hybrid press.

In general, lower torque is generated at servomotors than at flywheel clutches. Further, large-size hybrid presses would require large energy to accelerate the driven system because the inertial mass of the drive system is large. Therefore, the inventor of the present invention has found a problem in that in large-size hybrid presses, causing a slide to move upward and downward before and after pressure forming with a servomotor as in the conventional techniques would take time in accelerating an eccentric shaft up to a target rotational speed, thus rather reducing the lowering speed and the rising speed of the slide.

According to an aspect of the present invention, a forging press is provided in which a slide moves upward and/or downward at high speed, and a method of controlling the forging press is provided.

According to a forging press and a method of controlling the forging press according to an aspect of the present invention, it is possible to increase the lowering speed and the rising speed of a slide.

A description is given below, with reference to the accompanying drawings, of embodiments of the present invention.

Figure 1:
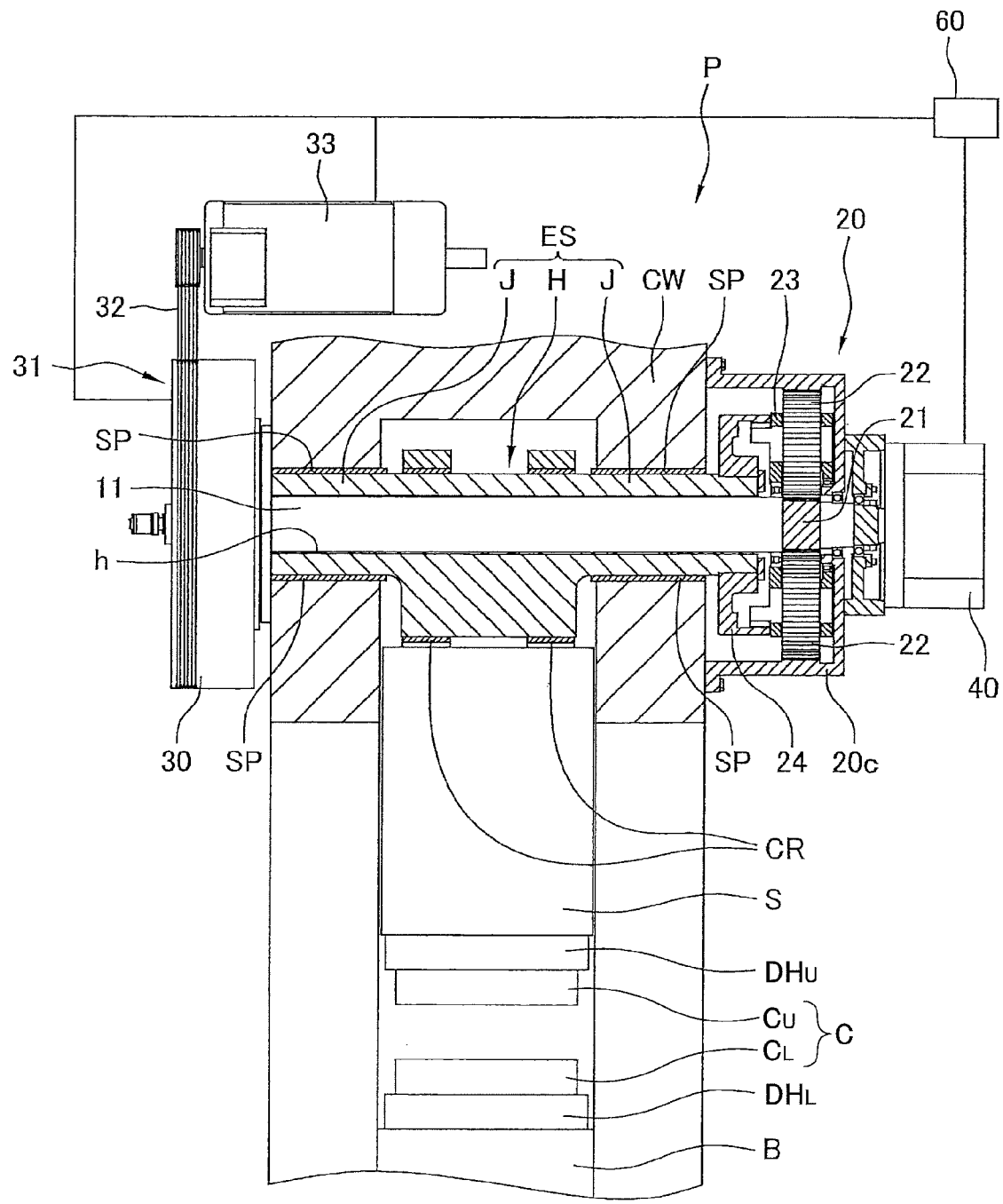
FIG. 1 is a schematic diagram illustrating a forging press that is an embodiment of the present invention.

First, a description is given, with reference to FIG. 1, of an overall structure of a forging press P that is an embodiment of the present invention.

Referring to FIG. 1, the forging press P includes a bed B, a lower die holder DH$_L$, an upper die holder DH$_U$, a slide S, connecting rods CR, an eccentric shaft ES, a crown CW, a transmission shaft 11, a transmission part 20, a flywheel 30, and a servomotor 40. A lower die C$_L$ of a die C is attached to the upper surface of the lower die holder DH$_L$ provided on the upper surface of the bed B. An upper die C$_U$ of the die C is attached to the lower surface of the upper die holder DH$_U$ provided on the lower surface of the slide S. That is, the die C is attached to the slide S via the upper die holder DH$_U$.

The slide S is connected to an eccentric part H of the eccentric shaft (drive shaft) ES via the connecting rods CR. The eccentric shaft ES has a pair of journal parts J rotatably supported by the crown CW. The eccentric shaft ES is a so-called fully eccentric crank shaft, and has the journal parts J provided across the eccentric part H from each other. The journal parts J are concentric and have the same diameter. The eccentric shaft ES has the journal parts J rotatably supported by support parts SP of the crown CW, and is connected to a drive mechanism to be described below. The support parts SP are formed of bushes, etc.

Therefore, the eccentric shaft ES is caused to rotate by the drive mechanism to cause the slide S to move upward and downward, and when the slide S moves downward, a material is sandwiched between the upper die $C_U$ and the lower die $C_L$ of the die C to be forged.

Next, a description is given of the drive mechanism of the forging press P.

As illustrated in FIG. 1, a shaft placement hole h is formed in the eccentric shaft ES. The shaft placement hole h is a through hole penetrating through the eccentric shaft ES between its shaft ends. The shaft placement hole h penetrates through the journal parts J and the eccentric part H. The central axis of the shaft placement hole h is aligned with the central axis of the journal parts J. That is, the shaft placement hole h is concentric with the journal parts J.

The transmission shaft 11 is provided inside the shaft placement hole h. The transmission shaft 11 has a shaft diameter slightly smaller than the inside diameter of the shaft placement hole h. A case 20c of the below-described transmission part 20 and a body part of a clutch and brake unit 31 cause the central axis of the transmission shaft 11 to be aligned with the central axis of the shaft placement hole h. In other words, the transmission shaft 11 is concentric with the journal parts J of the eccentric shaft ES, and is held to be rotatable relative to the eccentric shaft ES.

Further, the transmission shaft 11 is formed to have such a length as to have both of its ends projecting from the corresponding ends of the eccentric shaft ES when provided in the shaft placement hole h of the eccentric shaft ES. The transmission shaft 11 has one end (the right end in FIG. 1) connected to the transmission part 20, which is a known planetary gear speed reducer.

A sun gear 21 of the transmission part 20 is fixed to a portion of the transmission shaft 11 projecting from the right end of the eccentric shaft ES. Multiple planet gears 22 mesh with the sun gear 21. The planet gears 22 mesh with teeth provided on the interior surface of the case 20c of the transmission part 20. The planet gears 22 are attached to a rotating member 23 so that their respective central axes are equidistant from the central axis of the transmission shaft 11. The rotating member 23 is rotatably supported on the transmission shaft 11 via a bearing or the like. Further, the rotating member 23 is connected by a gear coupling to a driven member 24 fixed to the right end of the eccentric shaft ES.

Therefore, when the transmission shaft 11 rotates, the multiple planet gears 22 revolve around the sun gear 21 while rotating, so that the rotating member 23 rotates on the central axis of the transmission shaft 11. Since the rotating member 23 and the driven member 24 rotate, being connected by a gear coupling, the eccentric shaft ES rotates on its central axis together with the driven member 24.

By adjusting the numbers of teeth of the sun gear 21 and the planet gears 22, it is possible to reduce the ratio of the number of turns of the eccentric shaft ES to the number of turns of the transmission shaft 11 to a predetermined value. Therefore, it is possible to cause high torque to be generated at the eccentric shaft ES.

The flywheel 30 including the clutch and brake unit 31 is attached to a portion of the transmission shaft 11 projecting from the left end of the eccentric shaft ES. The body part of the clutch and brake unit 31 is fixed to the crown CW. The clutch and brake unit 31 is so configured as to connect the flywheel 30 and the transmission shaft 11 when the clutch of the clutch and brake unit 31 is engaged. The flywheel 30 is connected via a V belt 32 to the main shaft of a flywheel (FW) motor 33 that serves as a power source. Therefore, when the clutch is engaged while the FW motor 33 is in operation, it is possible to transmit the driving of the flywheel 30 to the transmission shaft 11. Further, when the clutch is disengaged, the flywheel 30 and the transmission shaft 11 are disconnected, so that the driving of the flywheel 30 is prevented from being transmitted to the transmission shaft 11.

When the brake of the clutch and brake unit 31 is put into operation, the crown CW and the transmission shaft 11 are connected via the body part of the clutch and brake unit 31, so that the rotational speed of the transmission shaft 11 is reduced and the rotation of the transmission shaft 11 may be stopped.

In addition to the transmission part 20, the servomotor 40 is connected to the portion of the transmission shaft 11 projecting from the right end of the eccentric shaft ES. The transmission shaft 11 and the servomotor 40 are connected by the main shaft of the servomotor 40 directly connecting to the transmission shaft 11.

The forging press P further includes a control part 60. The control part 60 controls the engagement and disengagement of the clutch and the operation of the brake of the clutch and brake unit 31, and controls the operation of the FW motor 33 and the operation of the servomotor 40. The control part 60 performs the below-described switching of the operation of the flywheel 30 and the operation of the servomotor 40.

As described above, the forging press P includes both the flywheel 30 and the servomotor 40 as a drive source to cause the eccentric shaft ES to rotate. Accordingly, the forging press P is a so-called hybrid press.

Figure 2:
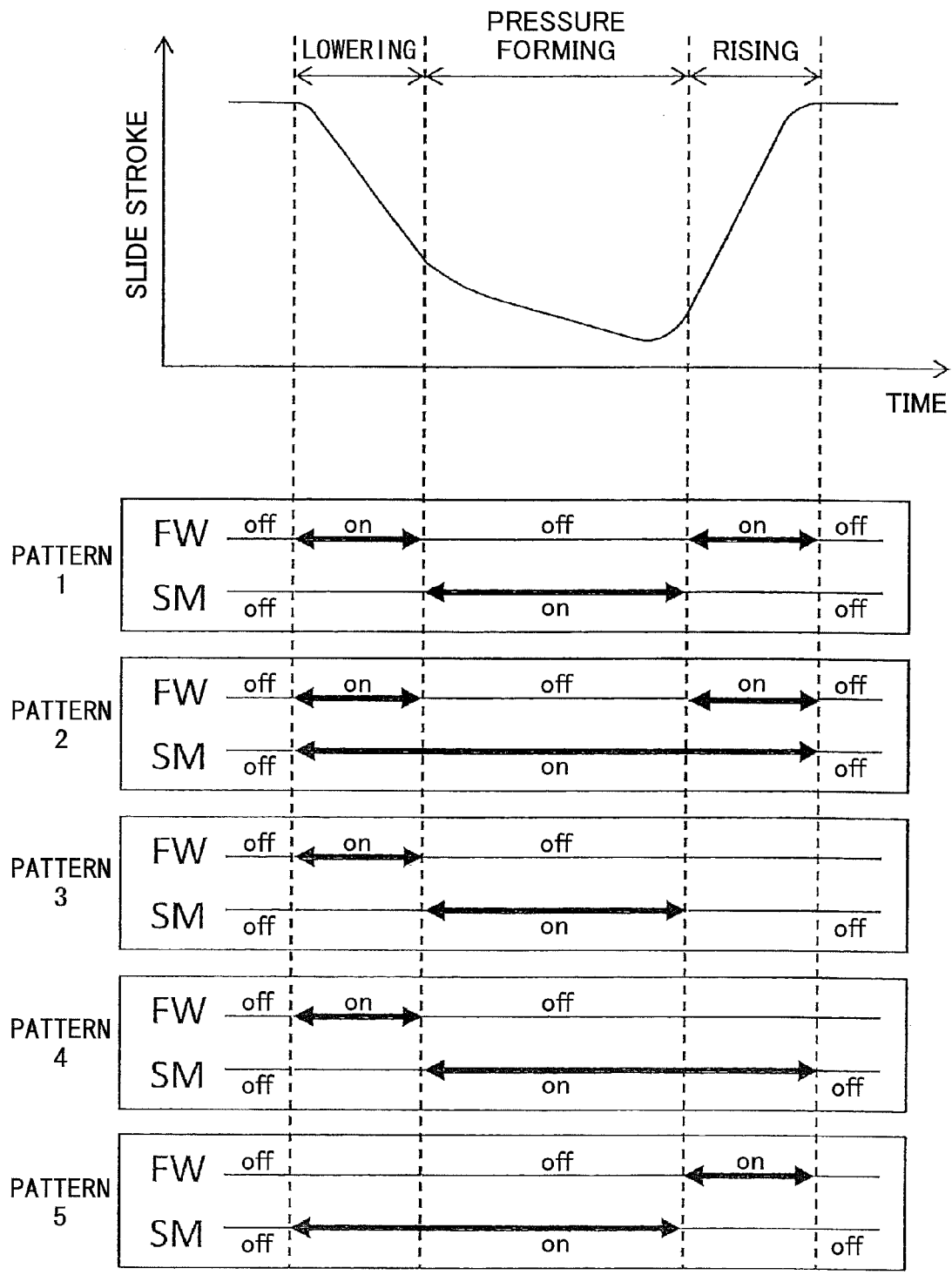
FIG. 2 is a diagram illustrating a method of controlling the forging press.
Figure 3:
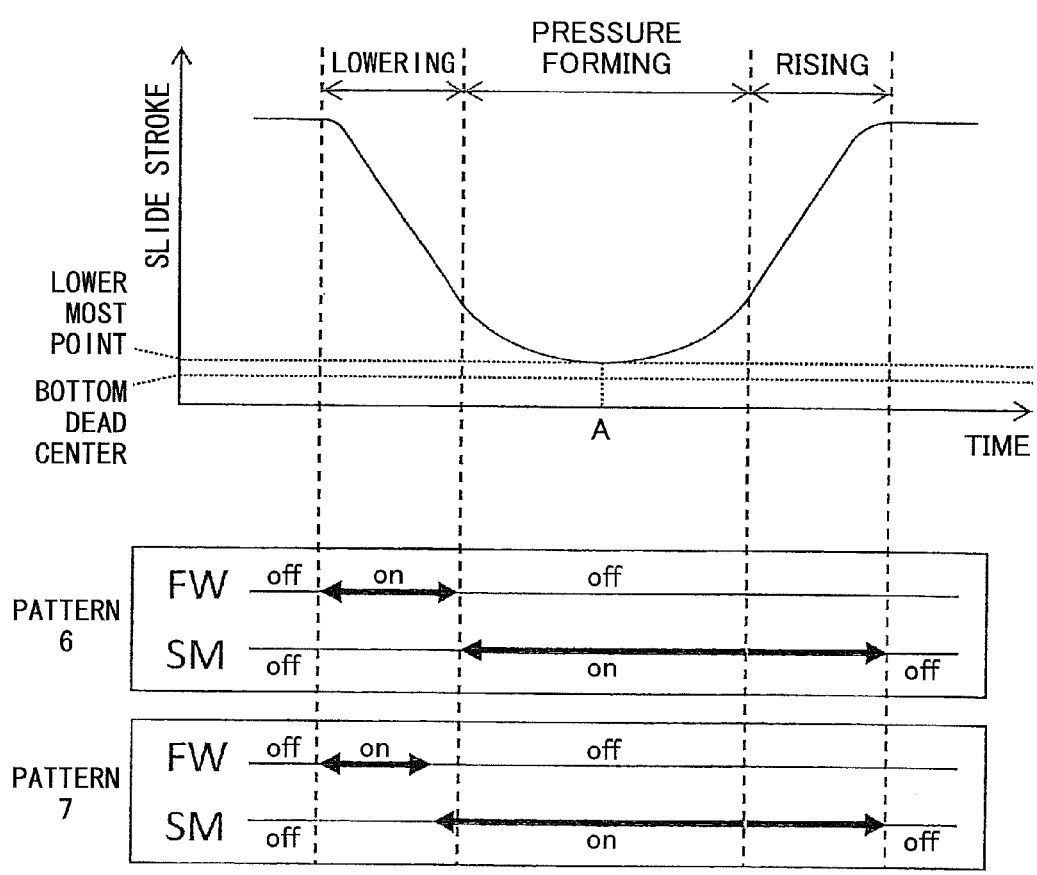
FIG. 3 is a diagram illustrating another method of controlling the forging press.

Next, a description is given, with reference to FIG. 2 and FIG. 3, of a method of controlling the forging press P.

FIG. 2 illustrates a basic slide motion of a press. One cycle of a slide motion is roughly divided into three processes of lowering, pressure forming, and rising. The lowering process, in which the slide S lowers, is a process from the start of the lowering of the slide S from the uppermost point (for example, the top dead center) of a stroke up to the contact of the upper die $C_U$ with a material (an item to be formed). The pressure forming process, in which the material is subjected to pressure forming using the upper die $C_U$ and the lower die $C_L$, is a process from the contact of the upper die $C_U$ with the material up to the separation of the upper die $C_U$ from the material after the slide S reaching the lowermost point (for example, bottom dead center) of the stroke. The rising process, in which the slide S rises, is a process from the separation of the upper die $C_U$ from the material up to the slide S rising to the uppermost point of the stroke.

According to an aspect of the invention, the operation of the flywheel 30 and the operation of the servomotor 40 are switched in the processes. In FIG. 2, Patterns 1 through 5 illustrate operation patterns of the flywheel 30 and the servomotor 40.

In FIG. 2, FW denotes the flywheel 30 and SM denotes the servomotor 40. In a process where the flywheel 30 is "off," the clutch of the clutch and brake unit 31 is disengaged, so that the driving of the flywheel 30 is prevented from being transmitted to the transmission shaft 11. In a process where the flywheel 30 is "on," the clutch of the clutch and brake unit 31 is engaged, so that the driving of the flywheel 30 is transmitted to the transmission shaft 11. In a process where the servomotor 40 is "off," the servomotor 40 is fed with no electric power, so that the servomotor 40 is caused to rotate by the transmission shaft 11 or is stopped together with the transmission shaft 11. In a process where the servomotor 40 is "on," the servomotor 40 is fed with electric power, so that the driving of the servomotor 40 is transmitted to the transmission shaft 11.

A description is given below of Patterns 1 through 5.

[Pattern 1]

First, in the lowering process, the clutch of the clutch and brake unit 31 is engaged, so that the driving of the flywheel 30 causes the transmission shaft 11 and the eccentric shaft ES to rotate to lower the slide S. During this operation, the servomotor 40 is fed with no electric power, and is caused to rotate by the transmission shaft 11.

In general, higher torque is generated at the flywheel 30 than at the servomotor 40. Since the slide S is caused to lower with the driving of this flywheel 30, it does not take time before accelerating the transmission shaft 11 to a target rotational speed even when the inertial mass of the driven system is large. As a result, it is possible to increase the lowering speed of the slide S. Here, the driven system includes parts caused to operate by the drive system of the flywheel 30 and/or the servomotor 40, such as the transmission shaft 11, the eccentric shaft ES, the connecting rods CR, the slide S, the upper die holder DHu, and the upper die Cu. In the case of a large-size press, the inertial mass of this driven system increases. Accordingly, the control method according to an aspect of the present invention is suitable to control the large-size forging press P.

Next, in the pressure forming process, the clutch of the clutch and brake unit 31 is disengaged. Then, pressure forming is performed by causing the transmission shaft 11 and the eccentric shaft ES to rotate with the driving of the servomotor 40.

Thus, pressure forming is performed with the driving of the servomotor 40. Accordingly, it is possible to control the pressing speed as desired. Further, it is possible to determine the slide motion during pressure forming as desired. Therefore, it is possible to achieve various kinds of processing methods suitable for hot forging, for which a high pressing speed is desired, and the formation of a complicated shape.

Next, in the rising process, the clutch of the clutch and brake unit 31 is engaged, so that the driving of the flywheel 30 causes the transmission shaft 11 and the eccentric shaft ES to rotate to raise the slide S. During this operation, the servomotor 40 is fed with no electric power, and is caused to rotate by the transmission shaft 11.

Since the slide S is caused to rise with the driving of the flywheel 30 at which high torque is generated, it does not take time before accelerating the transmission shaft 11 to a target rotational speed even when the inertial mass of the driven system is large. As a result, it is possible to increase the rising speed of the slide S.

[Pattern 2]

Pattern 2 is a pattern where in the lowering process and the rising process, the clutch of the clutch and brake unit 31 is engaged and the servomotor 40 is fed with electric power, so that the slide S is caused to lower and rise with the driving of both the flywheel 30 and the servomotor 40.

In the case where it takes time before accelerating the transmission shaft 11 to a target rotational speed even with torque from the flywheel 30 and the clutch and brake unit 31 because of large inertial mass of the driven system, the time for accelerating the transmission shaft 11 to a target rotational speed may be reduced by driving the transmission shaft 11 also with the servomotor 40 compared with the case of driving with the flywheel 30 alone. As a result, it is possible to increase the rising speed and the lowering speed of the slide S.

[Pattern 3]

Pattern 3 is a pattern where in the rising process of Pattern 1, the clutch of the clutch and brake unit 31 is disengaged and the servomotor 40 is fed with no electric power, and the servomotor 40 is caused to rotate by the transmission shaft 11 with the inertial energy of the driven system.

The driven system has a disposition to continue moving with inertial energy once the driven system starts to move. Therefore, after the pressure forming process, the slide S rises with its inertial energy. When there is no need to accelerate the rotation of the transmission shaft 11 in the rising process, the driving of the flywheel 30 and the servomotor 40 may not be fed to the transmission shaft 11 as in this pattern.

[Pattern 4]

Pattern 4 is a pattern where in the rising process of Pattern 1, the clutch of the clutch and brake unit 31 is disengaged, and the slide S is caused to rise by causing the eccentric shaft ES to rotate with the driving of the servomotor 40.

In the rising process, there is no need to accelerate the rotation of the transmission shaft 11. However, when driving to cause the slide S to rise to the uppermost point is desired, the transmission shaft 11 may be caused to rotate with the driving of the servomotor 40 in place of the flywheel 30.

[Pattern 5]

In Pattern 4, the transmission shaft 11 is caused to rotate with the driving of the flywheel 30 only in the lowering process. Alternatively, the transmission shaft 11 may be caused to rotate with the driving of the flywheel 30 only in the rising process. In this case, in the rising process, the servomotor 40 is fed with no electric power, and is caused to rotate by the transmission shaft 11.

By thus causing the slide S to rise with the driving of the flywheel 30 at which high torque is generated only in the rising process, it is possible to increase the rising speed of the slide S.

Next, a description is given of Patterns 6 and 7 with a different slide motion.

In the slide motion illustrated in FIG. 3, the lowermost point of the slide S is higher than the bottom dead center of the slide S. This slide motion is achieved by causing the slide S to rise by causing the transmission shaft 11 to rotate in a direction reverse to that at the time of the lowering of the slide S when the slide S reaches a predetermined lowermost point (at time A in FIG. 3), that is, before the slide S reaches the bottom dead center.

[Pattern 6]

In the pressure forming process of Pattern 6, the clutch of the clutch and brake unit 31 is disengaged, and pressure forming is performed by causing the transmission shaft 11 and the eccentric shaft ES to rotate with the driving of the servomotor 40. When the slide S reaches the lowermost point (at time A), the servomotor 40 is caused to rotate in the reverse direction, thereby causing the transmission shaft 11 to rotate in the reverse direction to cause the slide S to rise.

Further, in the rising process as well, with the clutch of the clutch and brake unit 31 being kept disengaged, the transmission shaft 11 and the eccentric shaft ES are caused to rotate in the reverse direction with the driving of the servomotor 40, thereby causing the slide S to rise.

By performing control according to this pattern, it is possible to prevent the sticking, or the stoppage at the bottom dead center, of the slide S. As a result, it is possible to prevent damage to members of the forging press P or the die C. Further, in the case of hot forging, the occurrence of sticking causes the die C to become high in temperature and be hardened, and causes a material to be cooled through transfer of its heat to the die C to be blackened. Performing control according to this pattern makes it possible to prevent such a problem.

Examples of forming according to such a slide motion include processing of thin products such as blades. In processing thin products, while the lowermost point of the slide S is gradually lowered each cycle, a material is pressed multiple times to be compressed to a predetermined thickness. Performing control according to this pattern makes it possible to achieve this pressing method.

[Pattern 7]

According to Pattern 6, the servomotor is caused to rotate in the reverse direction to cause the slide S to rise when the slide S reaches the lowermost point. Alternatively, the servomotor 40 may be caused to provide the transmission shaft 11 with torque in the reverse rotational direction before the slide S reaches the lowermost point, and the servomotor 40 may be caused to rotate in the reverse direction to cause the slide S to rise after the slide S reaches the lowermost point.

More specifically, during the lowering process, the clutch of the clutch and brake unit 31 is disengaged and the servomotor 40 is caused to provide the transmission shaft 11 with torque in the reverse rotational direction to brake the lowering of the slide S. When the slide S reaches the lowermost point (at time A), by completely consuming the kinetic energy of the driven system, the transmission shaft 11 is caused to rotate in the reverse direction to cause the slide S to rise.

According to this pattern, the servomotor 40 is caused to provide the transmission shaft 11 with torque in the reverse rotational direction before the slide S reaches the lowermost point. Accordingly, the lowering switches quickly to the rising at the lowermost point.

In the above description of Patterns 1 through 6, the engagement and disengagement of the clutch of the clutch and brake unit 31 and the operation of the servomotor 40 are switched at the boundaries of the lowering process, the pressure forming process, and the rising process. However, the engagement and disengagement of the clutch and the operation of the servomotor 40 may be switched before or after the boundaries of the individual processes in terms of time.

At the time of engaging the clutch, the impact of the clutch may be reduced by matching the rotational speed of the transmission shaft 11 with the rotational speed of the flywheel 30. Therefore, by causing the engagement and disengagement of the clutch and the operation of the servomotor 40 to be switched before or after the boundaries of the individual processes in terms of time, it is possible to reduce the impact of the clutch by matching the rotational speed of the transmission shaft 11 with the rotational speed of the flywheel 30.

Further, press working may be performed continuously by repeating any one of Patterns 1 through 7 described above. Alternatively, press working may be performed with a pattern different from cycle to cycle. For example, in a transfer press that has multiple dies and feeds a material to the dies of subsequent processes in a sequential manner using a transfer feeder, it is preferable to perform control with an optimum pattern that suits a forming method cycle by cycle.

Figure 4:
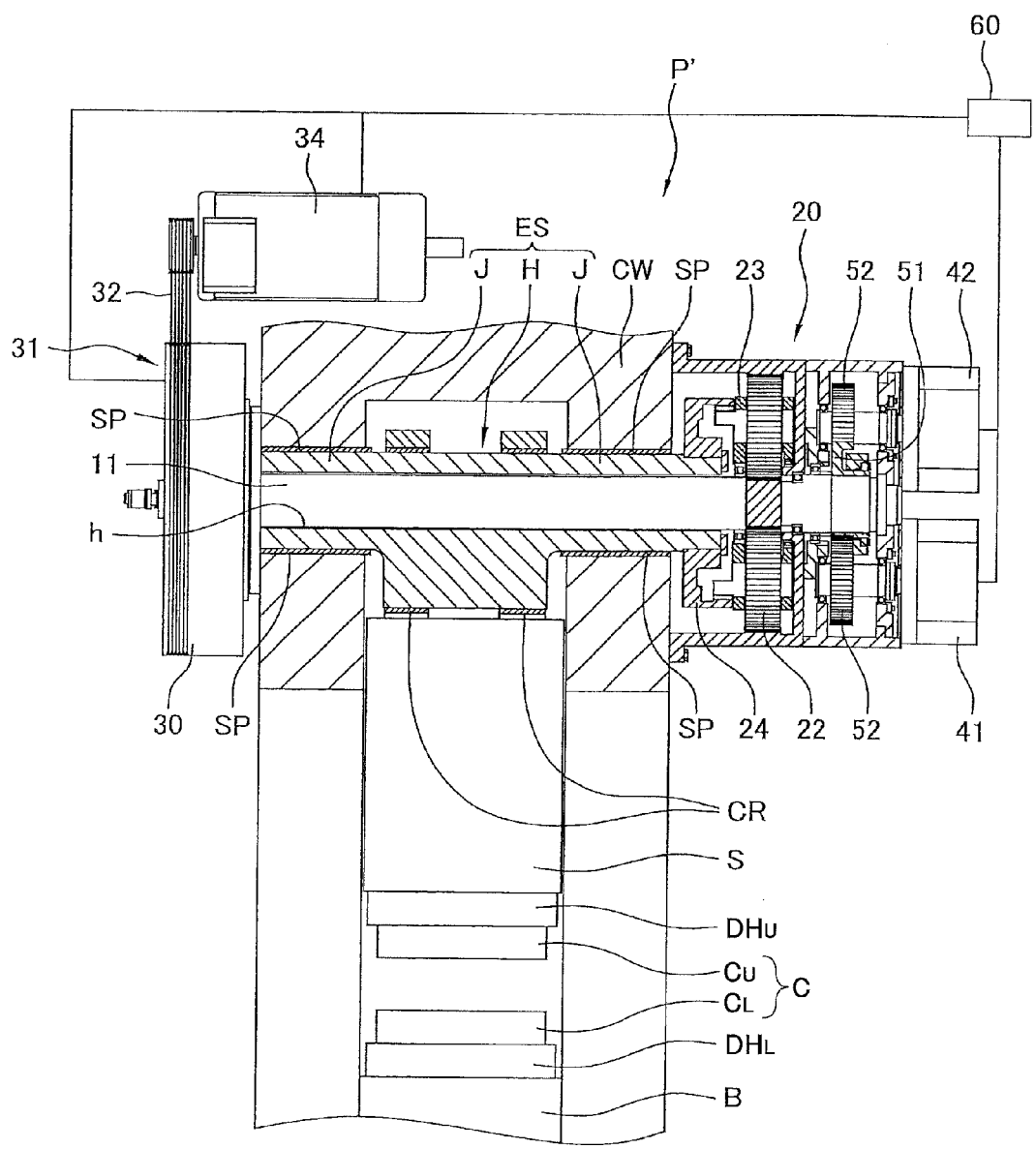
FIG. 4 is a schematic diagram illustrating a forging press that is another embodiment of the present invention.

Next, a description is given, with reference to FIG. 4, of a forging press P' that is another embodiment of the present invention.

The forging press P' that is another embodiment of the present invention includes a main gear 51 fixed to the right end of the transmission shaft 11 and multiple driving gears 52 that mesh with the main gear 51. The main shafts of servomotors 41 and 42, which are fixed to the crown CW with a frame or the like, are connected to the respective driving gears 52. This allows the transmission shaft 11 to be fed with driving forces from the multiple servomotors 41 and 42. Therefore, even if the driving force generated by each of the servomotors 41 and 42 is small, it is possible to feed the transmission shaft 11 with a large driving force.

Otherwise, the forging press P' has the same configuration as the above-described forging press P that is an embodiment of the present invention. Accordingly, the same members as those of the forging press P are referred to by the same reference numerals, and a description thereof is omitted.

Driving forces are transmitted from the small-diameter driving gears 52 to the large-diameter main gear 51. Therefore, the rotational speed of the servomotors 41 and 42 may be reduced to be transmitted to the transmission shaft 11. That is, the main gear 51 and the driving gears 52 form a speed reducer.

Further, the speed reduction ratio may be changed by adjusting the diameters of the driving gears 52 and the main gear 51. By changing the speed reduction ratio, the maximum rotational speed of the transmission shaft 11 due to the driving of the servomotors 41 and 42 may be set as desired. This makes it possible to achieve various kinds of pressing methods.

It is possible to further increase the speed reduction ratio by providing an intermediate gear between the driving gears 52 and the main gear 51. This makes it possible to generate higher torque even with the high-speed, low-torque servomotors 41 and 42. Accordingly, this may be adopted for a press for which greater forging energy is desired. For example, by providing pinions fixed to the main shafts of the servomotors 41 and 42 and intermediate gears that mesh with these pinions and providing rotating shafts that connect the intermediate gears and the driving gears 52, the rotational speed of the servomotors 41 and 42 may be further reduced to be transmitted to the main gear 51.

In the forging press P' as well, the same control may be performed as in the above-described forging press P that is an embodiment of the present invention.

Therefore, the slide S is caused to rise and lower with the driving of the flywheel 30 that retains high energy. Accordingly, even when the inertial mass of the driven system is large, it does not take time before accelerating the transmission shaft 11 to a target rotational speed. As a result, it is possible to increase the rising speed and the lowering speed of the slide S.

A forging press according to an aspect of the present invention may have any configuration as long as a flywheel and a servomotor are connected to a drive shaft that causes a slide to rise and lower. For example, in the above-described embodiments of the present invention, the flywheel 30 and the servomotor 40 (41, 42) may be connected to the eccentric shaft ES without the transmission shaft 11 and the transmission part 20. Further, the servomotor 40 (41, 42) and the drive shaft may be connected via a clutch.

Further, the control part 60 may be implemented by a single controller that controls the operations of the clutch and brake unit 31 and the servomotor 40 or may be implemented by a first controller that controls the operation of the clutch and brake unit 31 and a second controller that controls the operation of the servomotor 40.

A forging press according to an aspect of the present invention includes a slide configured to have a die attached thereto; a drive shaft configured to cause the slide to rise and lower by rotating; a flywheel connected to the drive shaft via a clutch; a servomotor connected to the drive shaft; and a control part configured to control respective operations of the clutch and the servomotor, wherein the control part is configured to perform such control as to cause the drive shaft to rotate with driving of the flywheel in at least one of a rising process, in which the slide is caused to rise, to cause the slide to rise and a lowering process, in which the slide is caused to lower, to cause the slide to lower.

According to this configuration, the slide is caused to rise and/or lower with the driving of the flywheel at which high torque is generated. Therefore, it does not take time before accelerating the drive shaft to a target rotational speed even when the inertial mass of the drive system is large. As a result, it is possible to increase the rising speed and/or the lowering speed of the slide.

The control part may be configured to perform such control as to perform pressure forming in a pressure forming process by disconnecting the flywheel and the drive shaft by disengaging the clutch, and causing the drive shaft to rotate with driving of the servomotor.

According to this configuration, pressure forming is performed with the driving of the servomotor. Accordingly, it is possible to adjust the pressing speed, and any slide motion may be set. Therefore, it is possible to achieve various kinds of processing methods.

The control part may be configured to perform such control as to cause the slide to rise by causing the servomotor to rotate in a reverse direction before the slide reaches a bottom dead center in the pressure forming process.

According to this configuration, the servomotor is caused to rotate in a reverse direction before the slide reaches the bottom dead center. Accordingly, it is possible to prevent the sticking, or the stoppage at the bottom dead center, of the slide. Further, it is possible to achieve a processing method that presses a material multiple times to compress the material to a predetermined thickness as in the processing of thin products.

The control part may be configured to perform such control as to cause the servomotor to provide the drive shaft with torque in a reverse rotational direction before the slide reaches a lowermost point, and to cause the slide to rise by causing the servomotor to rotate in a reverse direction after the slide reaches the lowermost point in the pressure forming process.

According to this configuration, the servomotor is caused to provide the drive shaft with torque in a reverse rotational direction before the slide reaches the bottom dead center. Accordingly, the lowering switches quickly to the rising at the lowermost point.

A method of controlling a forging press according to an aspect of the present invention, the forging press including a slide configured to have a die attached thereto, a drive shaft configured to cause the slide to rise and lower by rotating, a flywheel connected to the drive shaft via a clutch, and a servomotor connected to the drive shaft, includes causing the drive shaft to rotate with driving of the flywheel in at least one of a rising process, in which the slide is caused to rise, to cause the slide to rise and a lowering process, in which the slide is caused to lower, to cause the slide to lower.

According to this configuration, the slide is caused to rise and/or lower with the driving of the flywheel at which high torque is generated. Therefore, it does not take time before accelerating the drive shaft to a target rotational speed even when the inertial mass of the drive system is large. As a result, it is possible to increase the rising speed and/or the lowering speed of the slide.

In a pressure forming process, pressure forming may be performed by disconnecting the flywheel and the drive shaft by disengaging the clutch, and causing the drive shaft to rotate with driving of the servomotor.

According to this configuration, pressure forming is performed with the driving of the servomotor. Accordingly, it is possible to adjust the pressing speed, and any slide motion may be set. Therefore, it is possible to achieve various kinds of processing methods.

The slide may be caused to rise by causing the servomotor to rotate in a reverse direction before the slide reaches a bottom dead center in the pressure forming process.

According to this configuration, the servomotor is caused to rotate in a reverse direction before the slide reaches the bottom dead center. Accordingly, it is possible to prevent the sticking, or the stoppage at the bottom dead center, of the slide. Further, it is possible to achieve a processing method that presses a material multiple times to compress the material to a predetermined thickness as in the processing of thin products.

The servomotor may be caused to provide the drive shaft with torque in a reverse rotational direction before the slide reaches a lowermost point, and the slide may be caused to rise by causing the servomotor to rotate in a reverse direction after the slide reaches the lowermost point in the pressure forming process.

According to this configuration, the servomotor is caused to provide the drive shaft with torque in a reverse rotational direction before the slide reaches the bottom dead center. Accordingly, the lowering switches quickly to the rising at the lowermost point.

A description is given above of the forging press and the method of controlling a forging press based on the embodiments. All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A forging press, comprising:
   a slide having a die attached thereto;
   a drive shaft connected to the slide for raising and lowering the slide when the drive shaft rotates;
   a flywheel including a clutch, the flywheel being connected to the drive shaft when the clutch is engaged with the drive shaft;
   a servomotor connected to the drive shaft; and
   a control part connected to the clutch and the servomotor for controlling respective operations thereof,
   wherein the control part moves the slide by rotating the drive shaft by way of the flywheel connected thereto in at least one of a rising process and a lowering process,
   wherein the lowering process is a process from a start of lowering of the slide from an uppermost point of a stroke up to a contact of the die with a material to be subjected to pressure forming, and the rising process is a process from separation of the die from the material up to rising of the slide to the uppermost point of the stroke.

2. The forging press as claimed in claim 1, wherein the control part performs the pressure forming in a pressure forming process by
   disconnecting the flywheel and the drive shaft by disengaging the clutch, and
   rotating the drive shaft by driving the servomotor.

3. The forging press as claimed in claim 2, wherein the control part raises the slide by rotating the servomotor in a reverse direction before the slide reaches a bottom dead center in the pressure forming process.

4. The forging press as claimed in claim 2, wherein the control part provides the drive shaft with torque in a reverse rotational direction by way of the servomotor before the slide reaches a lowermost point, and to raise the slide by rotating the servomotor in a reverse direction after the slide reaches the lowermost point in the pressure forming process.

5. A method of controlling a forging press, the forging press including a slide having a die attached thereto, a drive shaft connected to the slide for raising and lowering the slide when the drive shaft rotates, a flywheel including a clutch, the flywheel being connected to the drive shaft when the clutch is engaged with the drive shaft, and a servomotor connected to the drive shaft, the method comprising:

moving the slide by rotating the drive shaft by way of the flywheel connected thereto in at least one of a rising process and a lowering process wherein the lowering process is a process from a start of lowering of the slide from an uppermost point of a stroke up to a contact of the die with a material to be subjected to pressure forming, and the rising process is a process from separation of the die from the material up to rising of the slide to the uppermost point of the stroke.

6. The method of controlling a forging press as claimed in claim 5, further comprising:

performing the pressure forming in a pressure forming process by disconnecting the flywheel and the drive shaft by disengaging the clutch, and rotating the drive shaft by driving the servomotor.

7. The method of controlling a forging press as claimed in claim 6, further comprising:

raising the slide by rotating the servomotor in a reverse direction before the slide reaches a bottom dead center in the pressure forming process.

8. The method of controlling a forging press as claimed in claim 6, further comprising:

providing the drive shaft with torque in a reverse rotational direction by way of the servomotor before the slide reaches a lowermost point, and raising the slide by rotating the servomotor in a reverse direction after the slide reaches the lowermost point in the pressure forming process.

\* \* \* \* \*